(12) United States Patent
Kim et al.

(10) Patent No.: US 10,128,936 B2
(45) Date of Patent: Nov. 13, 2018

(54) METHOD AND DEVICE FOR TRANSMITTING AND RECEIVING D2D SIGNAL BY RELAY TERMINAL IN WIRELESS ACCESS SYSTEM SUPPORTING DEVICE-TO-DEVICE COMMUNICATION

(71) Applicant: LG Electronics Inc., Seoul (KR)

(72) Inventors: Seonwook Kim, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/318,926

(22) PCT Filed: Jun. 30, 2015

(86) PCT No.: PCT/KR2015/006710
§ 371 (c)(1),
(2) Date: Dec. 14, 2016

(87) PCT Pub. No.: WO2016/006859
PCT Pub. Date: Jan. 14, 2016

(65) Prior Publication Data
US 2017/0126306 A1 May 4, 2017

Related U.S. Application Data

(60) Provisional application No. 62/021,682, filed on Jul. 7, 2014, provisional application No. 62/132,510, filed on Mar. 13, 2015.

(51) Int. Cl.
*H04W 72/04* (2009.01)
*H04B 7/155* (2006.01)
(Continued)

(52) U.S. Cl.
CPC ...... *H04B 7/15507* (2013.01); *H04W 72/044* (2013.01); *H04W 72/1289* (2013.01);
(Continued)

(58) Field of Classification Search
CPC .......... H04B 7/15507; H04W 72/1289; H04W 76/023; H04W 72/044; H04W 92/18; H04W 88/04
See application file for complete search history.

(56) References Cited

U.S. PATENT DOCUMENTS

2012/0184306 A1* 7/2012 Zou ................... H04W 74/0833
455/458
2012/0190368 A1* 7/2012 Zhang ............... H04W 36/0055
455/436
(Continued)

OTHER PUBLICATIONS

LG Electronics: "On the Resource Pool Configuration for D2D Communications", 3GPP TSG RAN WG1 Meeting #76, R1-140332, Feb. 10-14, 2014.
(Continued)

*Primary Examiner* — Jay P Patel
(74) *Attorney, Agent, or Firm* — Dentons US LLP

(57) ABSTRACT

Provided are methods for, in a wireless access system supporting device-to-device (D2D) communication, configuring a relay terminal and selecting a link through which the relay terminal can efficiently transmit a D2D signal, and devices for supporting same. A method for effectively transmitting a D2D signal by a relay terminal in a wireless access system supporting D2D communication, according to an embodiment of the present invention, comprises the steps of: receiving relay mode configuration information from a base station; receiving scheduling information about a first resource pool and a second resource pool from the base station; relaying a D2D signal through an access link in the first resource pool; and transmitting the D2D signal through
(Continued)

a one-hop D2D link in the second resource pool. The relay terminal is connected to both of the access link and the one-hop D2D link, wherein the access link can be configured for D2D relay communication with the base station, and the one-hop D2D link can be configured for D2D direct communication with another terminal.

8 Claims, 15 Drawing Sheets

(51) Int. Cl.
    *H04W 76/02*     (2009.01)
    *H04W 72/12*     (2009.01)
    *H04W 76/14*     (2018.01)
    *H04W 88/04*     (2009.01)
    *H04W 92/18*     (2009.01)

(52) U.S. Cl.
    CPC ......... *H04W 76/023* (2013.01); *H04W 76/14* (2018.02); *H04W 88/04* (2013.01); *H04W 92/18* (2013.01)

(56) References Cited

U.S. PATENT DOCUMENTS

| | | | |
|---|---|---|---|
| 2013/0308490 A1 | 11/2013 | Lim et al. | |
| 2014/0023008 A1 | 1/2014 | Ahn et al. | |
| 2014/0256334 A1* | 9/2014 | Kazmi | H04W 28/18 455/450 |
| 2015/0208384 A1* | 7/2015 | Baghel | H04W 72/04 455/450 |
| 2016/0173239 A1* | 6/2016 | Kim | H04L 1/1812 370/329 |
| 2016/0219541 A1* | 7/2016 | Chatterjee | H04W 36/0055 |
| 2018/0020459 A1* | 1/2018 | Chatterjee | H04W 28/08 |

OTHER PUBLICATIONS

Institute for Information Industry (III): "Resource pool configuration for partial coverage scenarios", 3GPP TSG RAN WG1 Meeting #76, R1-140425, Feb. 10-14, 2014.
LG Electronics: "Enhancements for Efficient Relaying Operations", 3GPP TSG RAN WG1 Meeting #74, R1-133386, Aug. 19-23, 2013.

* cited by examiner

FIG. 9
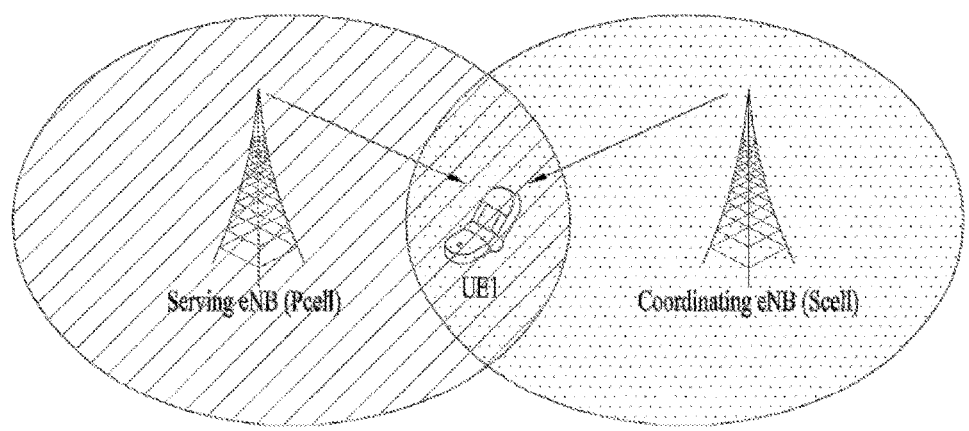
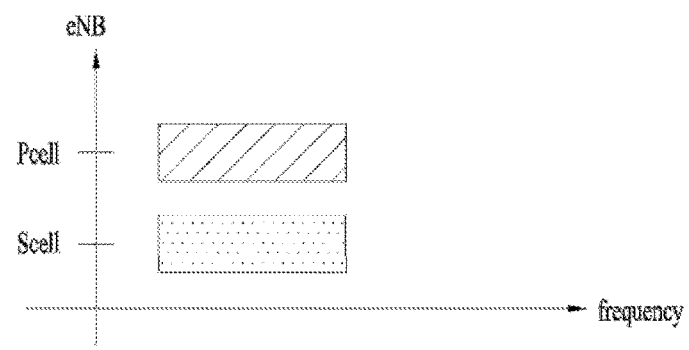

METHOD AND DEVICE FOR TRANSMITTING AND RECEIVING D2D SIGNAL BY RELAY TERMINAL IN WIRELESS ACCESS SYSTEM SUPPORTING DEVICE-TO-DEVICE COMMUNICATION

This application is a 35 USC § 371 National Stage entry of International Application No. PCT/KR2015/006710 filed on Jun. 30, 2015, and claims priority to U.S. Provisional Application Nos. 62/021,682 filed on Jul. 7, 2014 and 62/132,510 filed on Mar. 13, 2015, all of which are hereby incorporated by reference in their entireties as if fully set forth herein.

TECHNICAL FIELD

The present invention relates to a method of configuring a relay user equipment (rUE), a method for a rUE to select a link for transmitting a D2D signal, and an apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

An object of the present invention is to provide a method of efficiently supporting D2D communication in a wireless access system supporting D2D relay communication.

Another object of the present invention is to provide methods of configuring a relay UE (rUE) and designating a usage.

Another object of the present invention is to provide a method for a relay UE to select a link for transmitting a D2D signal.

Another object of the present invention is to provide a method of efficiently transmitting a D2D signal in a manner that a relay UE selects a link for transmitting a D2D signal in consideration of a transmission mode according to each link.

The other object of the present invention is to provide devices supporting the methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a method of configuring a relay user equipment (rUE), a method for a rUE to select a link for transmitting a D2D signal, and an apparatus for supporting the same.

To achieve these and other advantages and in accordance with the purpose of the present invention, as embodied and broadly described, according to one embodiment, a method of efficiently transmitting a D2D signal, which is transmitted by a relay user equipment (UE) in a wireless access system supporting device-to-device (D2D) communication, includes the steps of receiving relay mode configuration information from an eNB, receiving scheduling information on a first resource pool and a second resource pool from the eNB, relaying a D2D signal via an access link on the first resource pool, and transmitting a D2D signal via a one-hop D2D link on the second resource pool. In this case, the relay UE is connected to both the access link and the one-hop D2D link, the access link is configured for D2D relay communication with the eNB, and the one-hop D2D link can be configured for D2D direct communication with a different UE.

To further achieve these and other advantages and in accordance with the purpose of the present invention, according to a different embodiment, a relay user equipment (UE) for efficiently transmitting a D2D signal in a wireless access system supporting device-to-device (D2D) communication includes a transmitter, a receiver, and a processor configured to control the transmitter and the receiver to support the D2D communication, the processor configured to control the receiver to receive relay mode configuration information from an eNB, the processor configured to control the receiver to receive scheduling information on a first resource pool and a second resource pool from the eNB, the processor configured to control the transmitter to relay a D2D signal via an access link on the first resource pool, the processor configured to control the transmitter to transmit a D2D signal via a one-hop D2D link on the second resource pool. In this case, the relay UE is connected to both the access link and the one-hop D2D link, the access link is configured for D2D relay communication with the eNB, and the one-hop D2D link can be configured for D2D direct communication with a different UE.

The configuration mode information can indicate whether the relay UE is used for an uplink usage or a downlink usage. Hence, the relay UE can perform an uplink relay operation or a downlink relay operation according to the configuration mode information.

The first resource pool and the second resource pool can be allocated in a manner of being separated from each other in time domain.

The first resource pool and the second resource pool can be allocated in a manner of being overlapped with each other in a prescribed area.

If the first resource pool and the second resource pool are overlapped with each other, the relay UE can be configured to transmit a D2D signal via a single link only among the access link and the one-hop D2D link on the first resource pool and the second resource pool.

Or, if the first resource pool and the second resource pool are overlapped with each other, the relay UE transmits a D2D signal on the first resource pool and the second resource pool according to (1) a type or priority of D2D data to be transmitted via the access link and the one-hop D2D link, (2) transmission count ratio information between the access link and the one-hop D2D link, or (3) a link at which preferentially generated data exists among the access ink and the one-hop D2D link.

To further achieve these and other advantages and in accordance with the purpose of the present invention, according to a further different embodiment, a method of efficiently transmitting a D2D signal, which is transmitted by a relay user equipment (UE) in a wireless access system supporting device-to-device (D2D) communication, includes the steps of receiving a D2D grant including scheduling information on a resource pool from an eNB, selecting a link to transmit a D2D signal via a resource pool among an access link and a one-hop D2D link, and transmitting a D2D signal via a selected link. In this case, the relay UE is connected to both the access link and the one-hop D2D link, the access link is configured for D2D relay communication with the eNB, and the one-hop D2D link can be configured for D2D direct communication with a different UE.

To further achieve these and other advantages and in accordance with the purpose of the present invention, according to a further different embodiment, a relay user equipment (UE) for efficiently transmitting a D2D signal in a wireless access system supporting device-to-device (D2D) communication includes a transmitter, a receiver, and a processor configured to control the transmitter and the receiver to support D2D signal transmission, the processor configured to control the receiver to receive a D2D grant including scheduling information on a resource pool from the eNB, the processor configured to select a link to transmit a D2D signal via a resource pool among the access link and the one-hop D2D link, the processor configured to control the transmitter to transmit a D2D signal via the selected link. In this case, the relay UE is connected to both the access link and the one-hop D2D link, the access link is configured for D2D relay communication with the eNB, and the one-hop D2D link can be configured for D2D direct communication with a different UE.

The link can be selected according to transmission count ratio information between the access link and the one-hop D2D link.

The link can be selected by a link at which a preferentially generated data exists among the access link and the one-hop D2D link.

The link can be selected according to a type or priority of D2D data to be transmitted via the access link and the one-hop D2D link.

The link can be selected by a link indicated by a D2D grant.

The D2D grant is individually transmitted in response to the access link and the one-hop D2D link and a separate resource pool can be scheduled in response to the access link and the one-hop D2D link.

The relay UE can perform buffer sate reporting on the access link and the one-hop D2D link. In this case, the buffer state reporting can be performed on the access link and the one-hop D2D link, respectively, using a relay ID for D2D relay communication and a D2D ID for D2D direct communication.

It is to be understood that both the foregoing general description and the following detailed description of the present invention are exemplary and explanatory and are intended to provide further explanation of the invention as claimed.

Advantageous Effects

As is apparent from the above description, the embodiments of the present invention have the following effects.

First, it is able to efficiently support D2D relay communication in a wireless access system supporting the D2D relay communication.

Second, it is able to select a terminal to perform relay in D2D communication.

Third, it is able to provide methods of selecting a link for transmitting a D2D signal to make a relay UE efficiently transmit a D2D signal in a state that the relay UE is connected to both an access link and a one-hop D2D link.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

DESCRIPTION OF DRAWINGS

The accompanying drawings, which are included to provide a further understanding of the invention, illustrate embodiments of the invention and together with the description serve to explain the principle of the invention.

FIG. 9 illustrates one of methods for transmitting SRS used in the embodiments of the present invention.

BEST MODE

Mode for Invention

Figure 1:
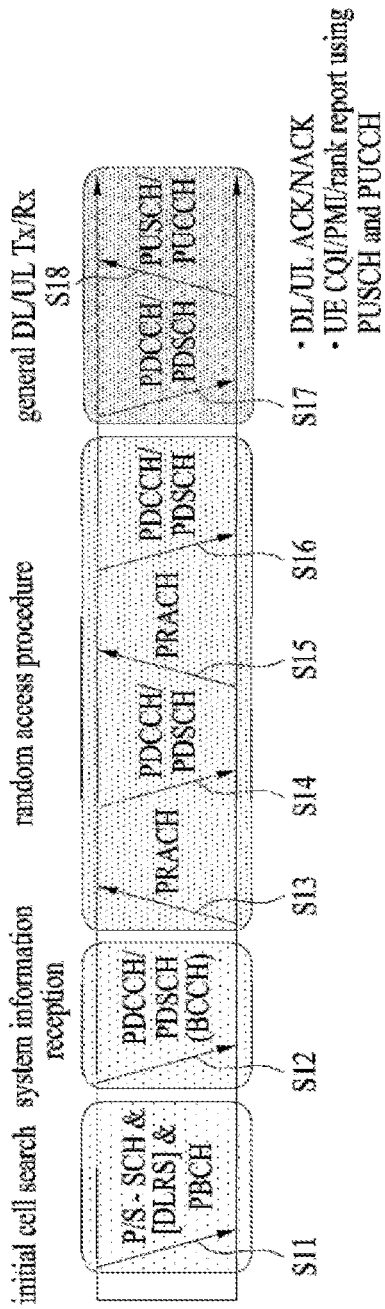
FIG. 1 is a conceptual diagram illustrating physical channels used in the embodiments and a signal transmission method using the physical channels.

In the following embodiments of the present invention, a method of configuring a relay UE (rUE), methods for a relay UE to select a link for transmitting a D2D signal, and devices supporting the methods are explained in detail.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
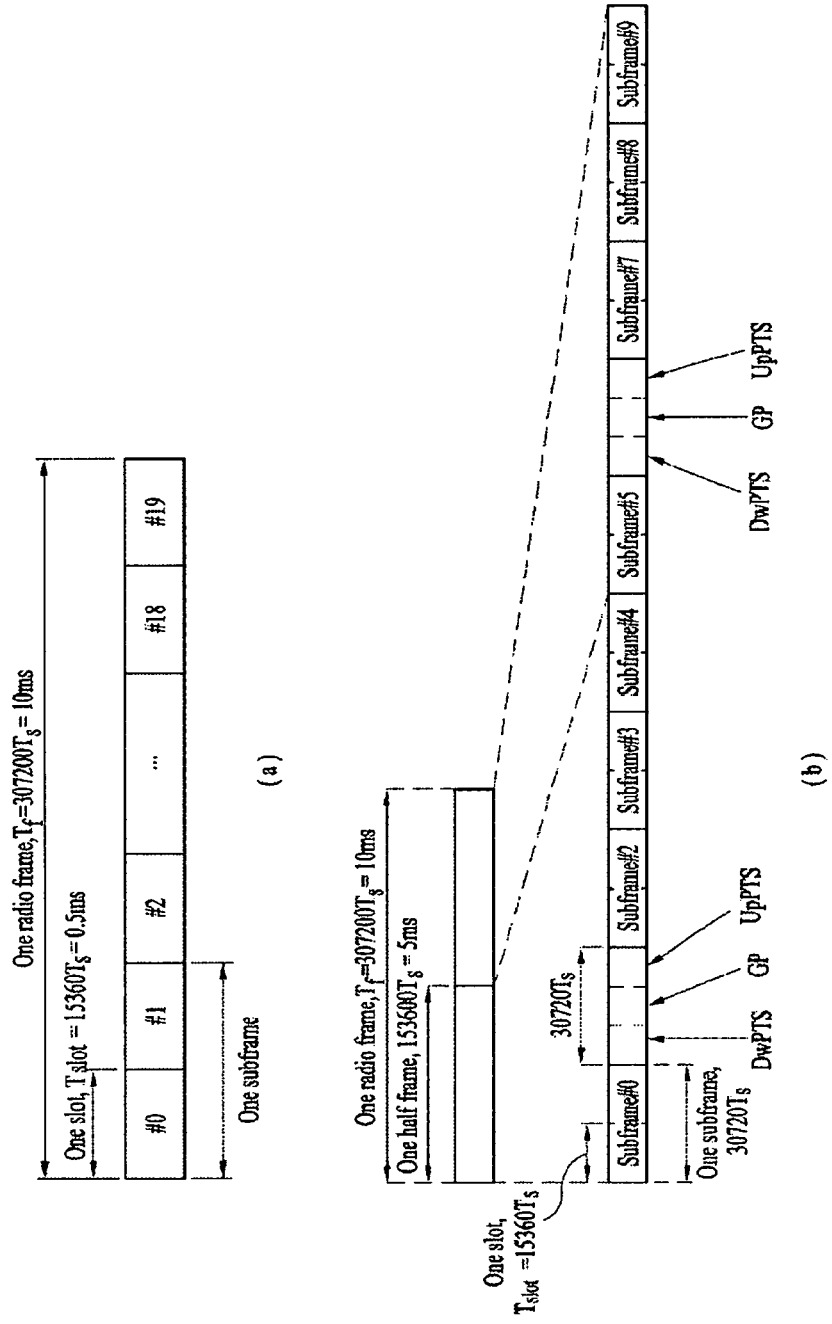
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
| --- | --- | --- | --- | --- | --- | --- |
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |

TABLE 1-continued

| | Normal cyclic prefix in downlink | | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
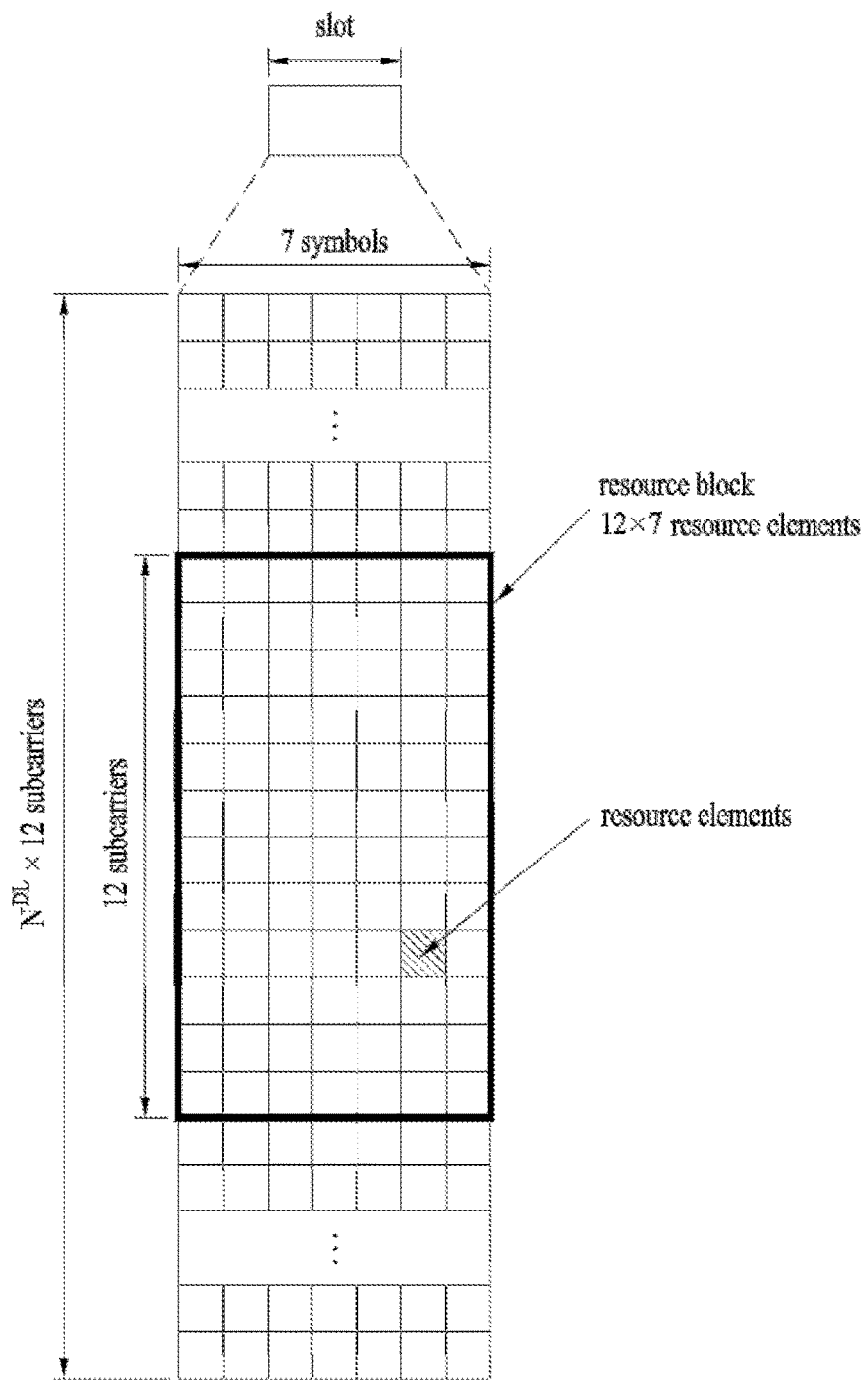
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
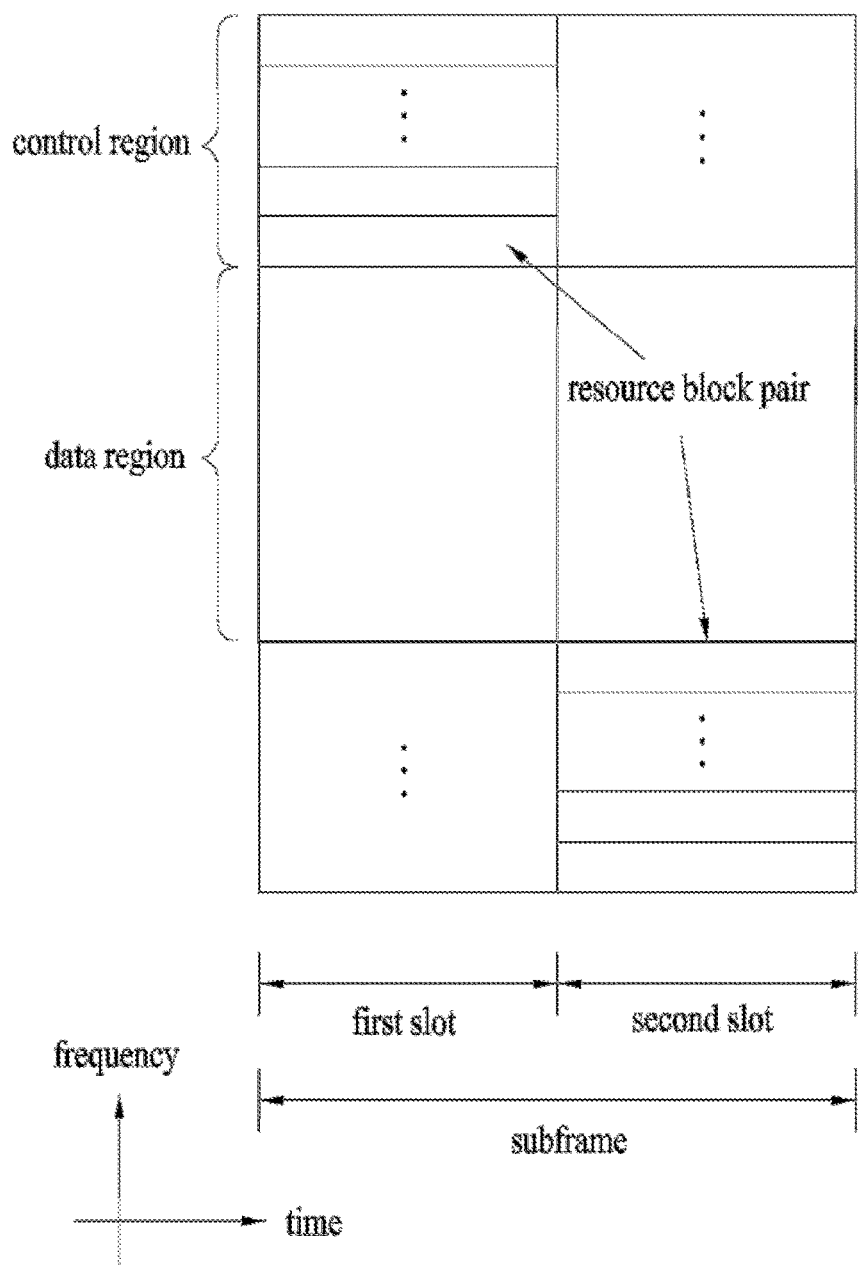
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
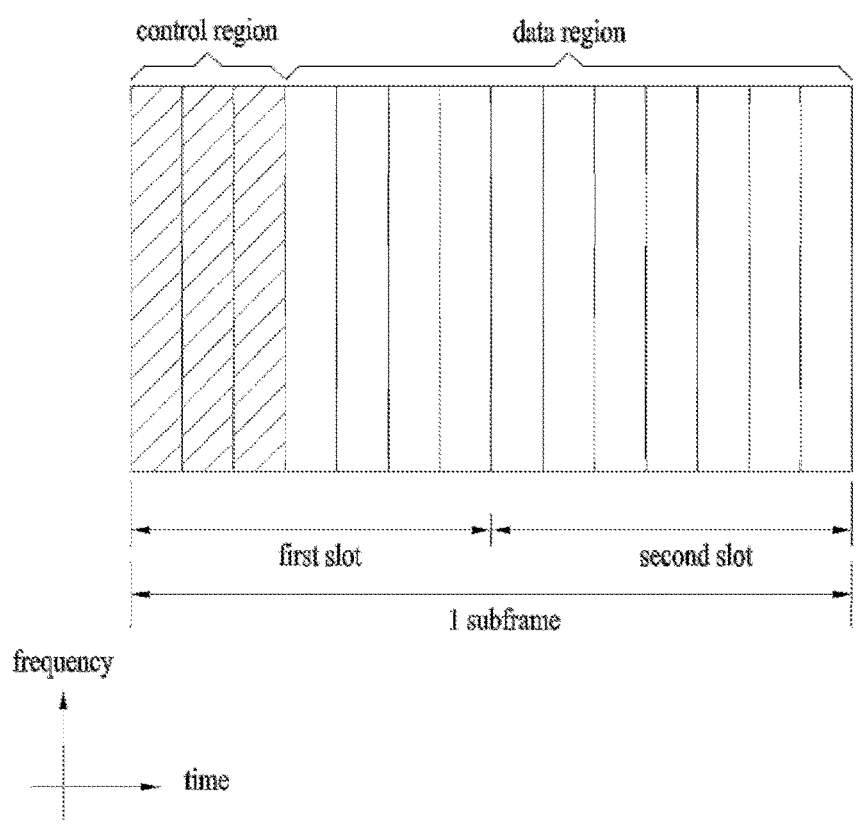
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other 01-DM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1, 2, 4, 8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 1]}$$

where $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$. $k=\lfloor n_s/2 \rfloor$ where is $n_s$ the index of a slot in a radio frame.

As described before, the UE monitors both the USS and the CSS to decode a PDCCH. The CSS supports PDCCHs with CCE aggregation levels $\{4, 8\}$ and the USS supports PDCCHs with CCE aggregation levels $\{1, 2, 4, 8\}$. [Table 5] illustrates PDCCH candidates monitored by a UE.

TABLE 5

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \qquad \text{[Equation 2]}$$

where $Y_{-1}=n_{RNTI} \neq 0$, $n_{RNTI}$ indicating an RNTI value. A=39827 and D=65537.

2. Carrier Aggregation (CA) Environment

2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
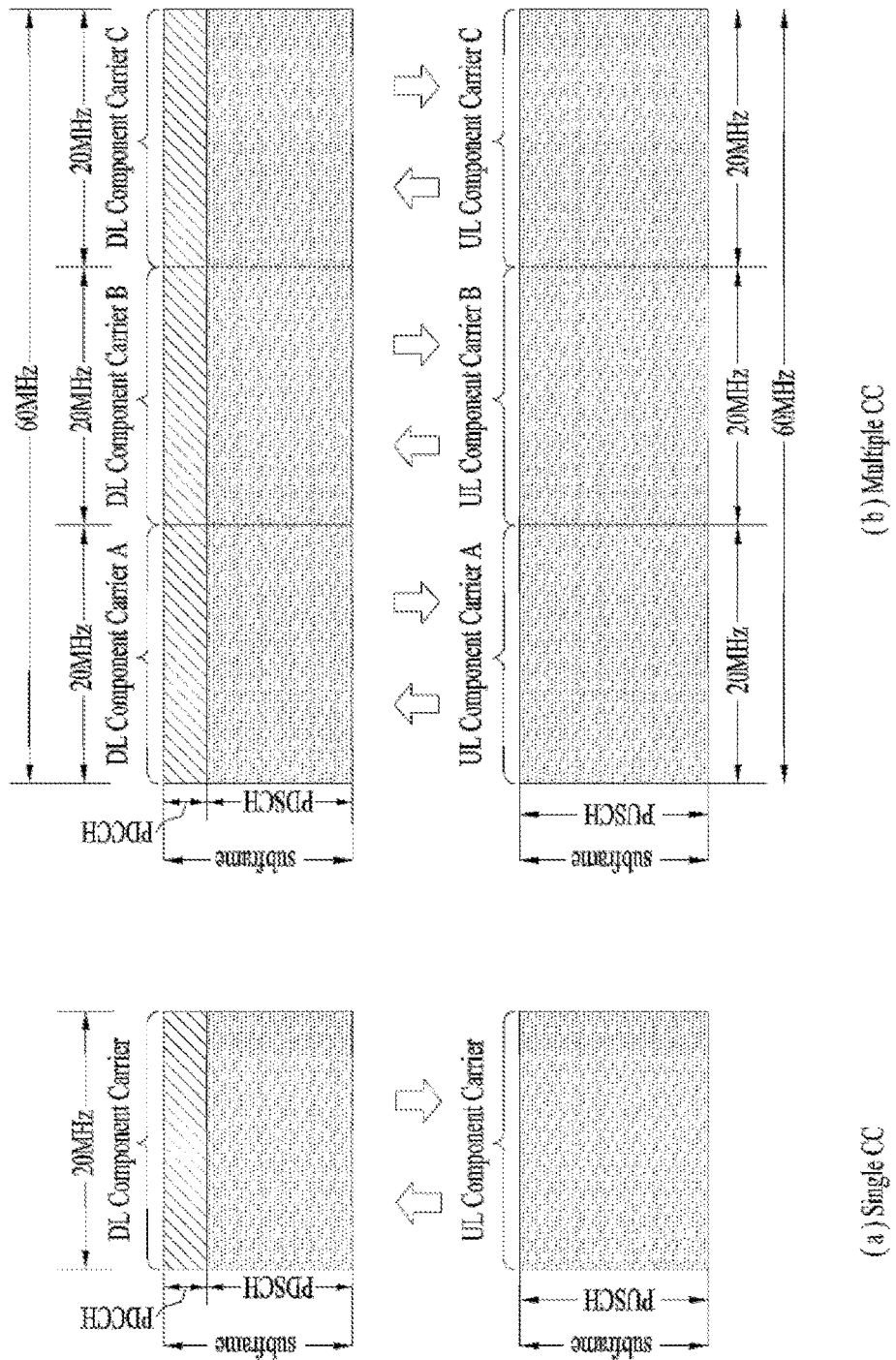
FIG. 6 is a diagram illustrating an example of a component carrier (CC) and carrier aggregation (CA) used in an LTE_A system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
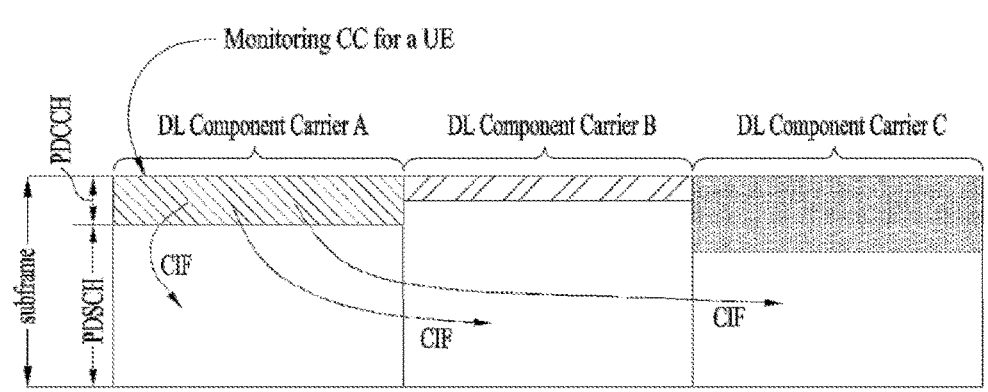
FIG. 7 illustrates a subframe structure of an LTE-A system according to cross-carrier scheduling.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
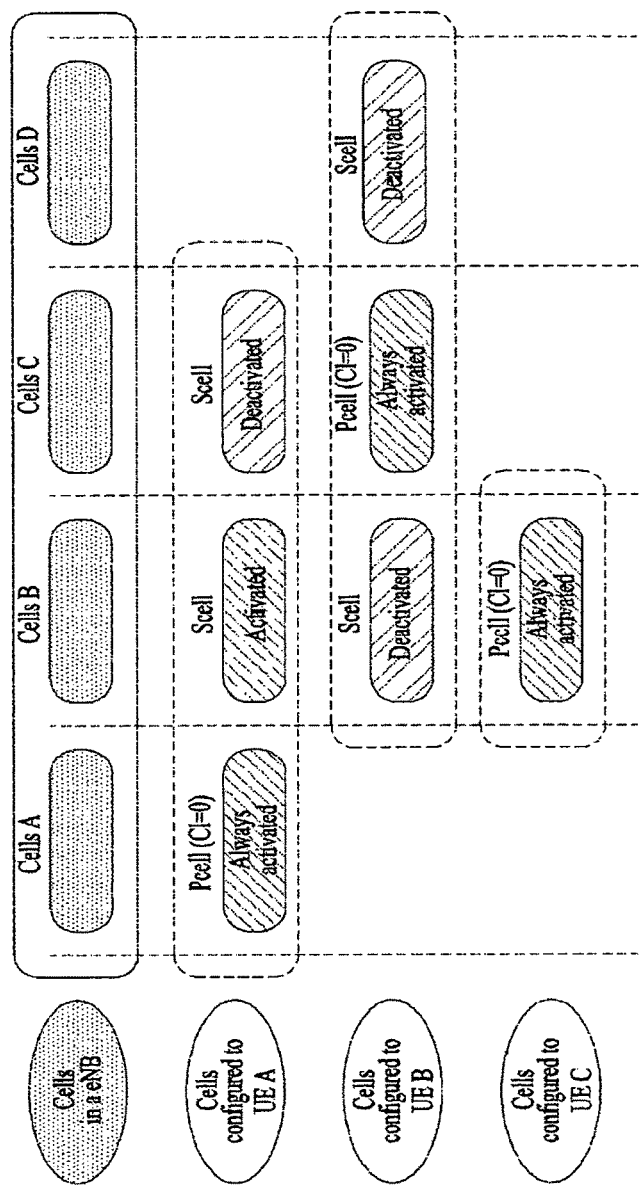
FIG. 8 is a conceptual diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of Pcell. In this case, Pcell is always activated, and Scell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA Environment Based CoMP Operation

Hereinafter, a cooperation multi-point (CoMP) transmission operation applicable to the embodiments of the present invention will be described.

In the LTE-A system, CoMP transmission may be implemented using a carrier aggregation (CA) function in the LTE. FIG. 9 is a conceptual view illustrating a CoMP system operated based on a CA environment.

In FIG. 9, it is assumed that a carrier operated as a Pcell and a carrier operated as an Scell may use the same frequency band on a frequency axis and are allocated to two eNBs geographically spaced apart from each other. At this time, a serving eNB of UE1 may be allocated to the Pcell, and a neighboring cell causing much interference may be allocated to the Scell. That is, the eNB of the Pcell and the eNB of the Scell may perform various DL/UL CoMP operations such as joint transmission (JT), CS/CB and dynamic cell selection for one UE.

FIG. 9 illustrates an example that cells managed by two eNBs are aggregated as Pcell and Scell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the Pcell does not always need to participate in CoMP operation.

2.4 Reference Signal (RS)

Hereinafter, reference signals that can be used in the embodiments of the present invention will be described.

Figure 10:
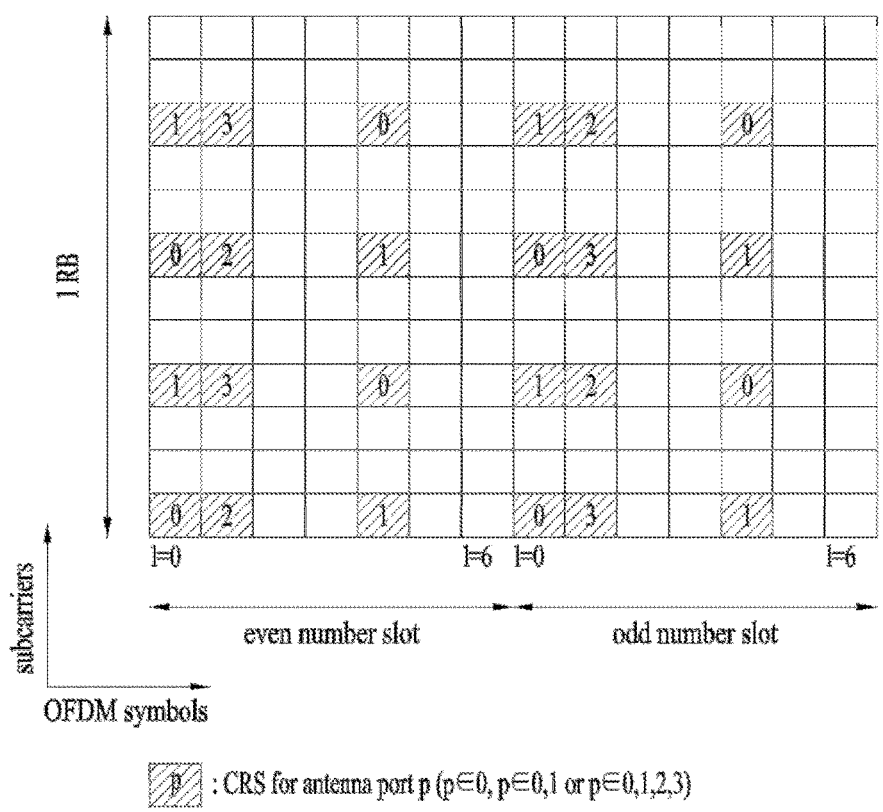
FIG. 10 illustrates an example of a subframe to which a cell specific reference signal (CRS) that can be used in the embodiments of the present invention is allocated.

FIG. 10 illustrates an example of a subframe to which a cell specific reference signal (CRS) that can be used in the embodiments of the present invention is allocated.

FIG. 10 illustrates an allocation structure of a CRS if four antennas are supported in a wireless access system. In a 3GPP LTE/LTE-A system, the CRS is used for decoding and channel state measurement. Therefore, the CRS is transmitted to all downlink bandwidths at all downlink subframes within a cell supporting PDSCH transmission, and is transmitted from all antenna ports configured in an eNB.

In more detail, CRS sequence is mapped to complex-valued modulation symbols used as reference symbols for an antenna port p at a slot $n_s$.

A UE may measure CSI by using the CRS, and may decode a downlink data signal received through a PDSCH at a subframe including the CRS, by using the CRS. That is, the eNB transmits the CRS from all RBs to a certain position within each RB, and the UE detects a PDSCH after performing channel estimation based on the CRS. For example, the UE measures a signal received at a CRS RE. The UE may detect a PDSCH signal from RE to which PDSCH is mapped, by using a ratio of receiving energy per CRS RE and a receiving energy per RE to which PDSCH is mapped.

As described above, if the PDSCH signal is transmitted based on the CRS, since the eNB should transmit the CRS to all RBs, unnecessary RS overhead is generated. To solve this problem, the 3GPP LTE-A system additionally defines UE-specific RS (hereinafter, UE-RS) and channel state information reference signal (CSI-RS) in addition to the CRS. The UE-RS is used for demodulation, and the CSI-RS is used to derive channel state information.

Since the UE-RS and the CRS are used for demodulation, they may be RSs for demodulation in view of use. That is, the UE-RS may be regarded as a kind of a demodulation reference signal (DM-RS). Also, since the CSI-RS and the CRS are used for channel measurement or channel estimation, they may be regarded as RSs for channel state measurement in view of use.

2.5 Enhanced PDCCH (EPDCCH)

In the 3GPP LTE/LTE-A system, cross carrier scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a search space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 11:
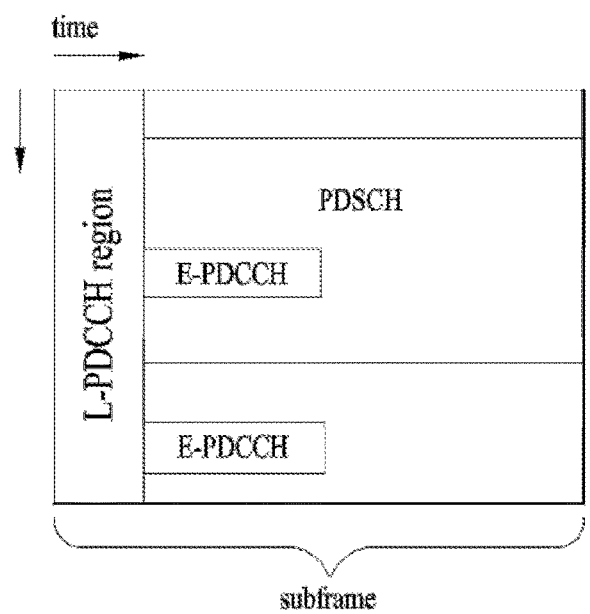
FIG. 11 illustrates an example that legacy PDCCH, PDSCH and E-PDCCH, which are used in an LTE/LTE-A system, are multiplexed.
Figure 12:
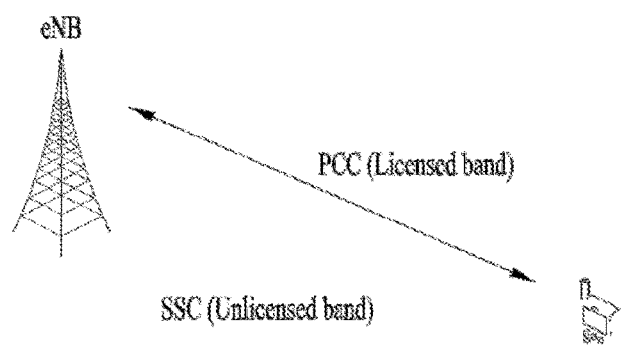
FIG. 12 illustrates an example of a CA environment supported in an LTE-U system.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 11 illustrates an example that legacy PDCCH, PDSCH and E-PDCCH, which are used in an LTE/LTE-A system, are multiplexed.

Figure 13:
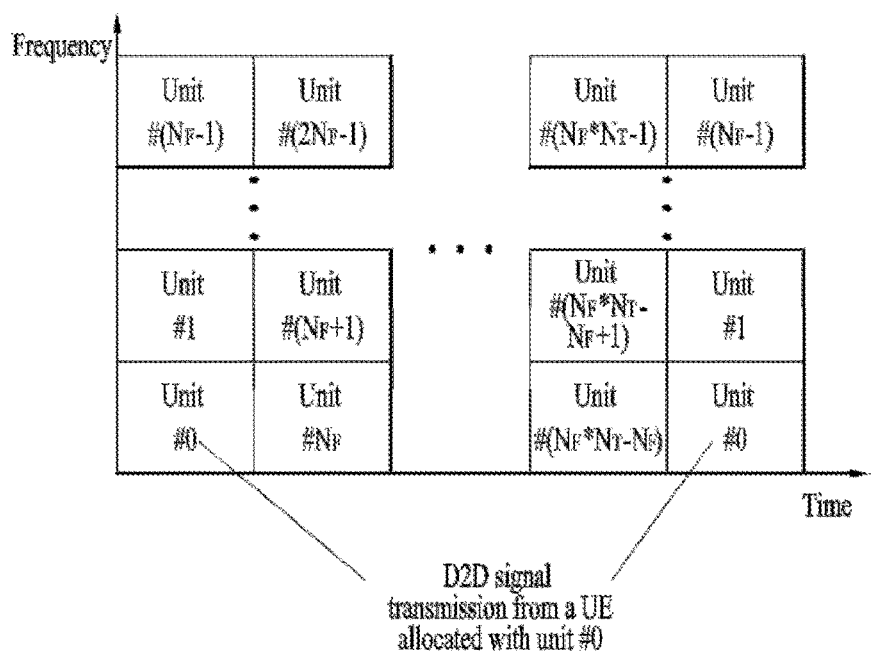
FIG. 13 is a diagram for explaining a resource configuration used in D2D communication.

3. Device to Device (D2D) Communication 3.1 Resource Configuration for D2D Communication In the following, a resource configuration used in D2D communication is explained. FIG. 13 is a diagram for explaining a resource configuration used in D2D communication.

In general, a resource pool includes a plurality of resource units. A UE selects one or more resource units from among a plurality of the resource units and may be able to use the selected resource unit(s) for D2D communication. FIG. 13 shows a method of configuring a resource unit. Referring to FIG. 13, the entire frequency resource pool is divided into the $N_F$ number of frequency units and the entire time resource pool is divided into the $N_T$ number of time units. In particular, the resource pool is able to be defined $N_F*N_T$ number of resource units in total.

In this case, a resource pool can be repeated with a period of $N_T$ subframes. And, one resource unit can be periodically and repeatedly allocated in a resource pool. For instance, it is able to see that resource units #0, #1, . . . , and #($N_F$−1) are repeatedly allocated in a resource pool with a period of prescribed time. In particular, if a resource unit #0 is allocated to a UE, the UE is able to use all resource units indexed by the resource unit #0 in a resource pool.

And, the resource units in the resource pool or the resource pool itself can be configured to change an index of a physical resource unit to which a logical resource unit is mapped with a predetermined pattern according to time to obtain a diversity gain in time domain and/or frequency domain. In this resource unit structure, a resource pool may correspond to a set of resource units capable of being used for a UE intending to transmit and receive a D2D signal to transmit and receive the D2D signal.

In the embodiments of the present invention, a resource pool for D2D communication can be classified into various types. First of all, the resource pool can be classified according to content or a type of a D2D signal transmitted via each resource pool. For example, a D2D signal can be classified into an SA (scheduling assignment) signal, a D2D data channel signal, a discovery channel signal, and the like.

The SA signal may correspond to a signal including information on a resource position to which a D2D data channel for D2D communication is assigned, information on MCS (modulation and coding scheme) necessary for modulating and demodulating a D2D data channel, information on a MIMO transmission scheme, and/or information on a TA (timing advance), and the like. The SA signal can be independently transmitted on a prescribed resource unit or the SA signal and D2D data can be transmitted on an identical resource unit in a manner of being multiplexed. When the SA signal and the data are multiplexed, an SA resource pool may correspond to a set of resource units that an SA and D2D data are transmitted in a manner of being multiplexed. In the embodiments of the present invention, a resource unit on which an SA signal is transmitted can be referred to as an SA channel or a D2D control channel.

A D2D data channel can be defined as a set of resource units for transmitting and receiving a D2D data using a resource designated by UEs via SA. The D2D data channel can be multiplexed with an SA channel. And, in case of the D2D data channel, a D2D data signal can be multiplexed only without an SA signal.

In this case, when an SA signal and a D2D data channel are transmitted in a manner of being multiplexed on an identical resource unit, it may be able to configure the D2D data channel to be transmitted only to a resource pool for the D2D data channel except the SA signal. In other word, a resource unit used for transmitting SA information on an individual resource unit in an SA resource pool can also be used for transmitting D2D data in the resource pool for the D2D data channel The discovery channel may correspond to a set of resource units for transmitting a signal or a message that enables a neighboring UE to discover a UE configured to perform D2D communication. The UE configured to perform D2D communication transmits information such as an identifier of the UE, and the like to the neighboring UE to make the neighboring UE discover the UE.

In this case, an SA channel for transmitting an SA signal, a data channel for transmitting and receiving D2D data, and a discovery channel for transmitting and receiving a discovery signal can be configured in a single resource pool. Or, each of the SA channel, the D2D data channel, and the discovery channel can be configured by a separate resource pool.

Or, although contents of D2D signal are identical to each other, a different resource pool can be allocated according to a transmission/reception attribute of the D2D signal.

For example, although D2D data channels have the same type or discovery channels have the same type, each of the D2D data channels or each of the discovery channels can be configured by a different resource pool according to (1) a transmission timing determination scheme of a D2D signal (e.g., whether a D2D signal is transmitted at a timing at which a synchronization reference signal is received or a timing of which a prescribed TA is applied to the reception timing), (2) a resource allocation scheme (e.g., a resource for transmitting an individual signal is designated to an individual transmission UE by an eNB or the individual transmission UE autonomously selects a resource for transmitting an individual signal from a resource pool), (3) a signal format (e.g., the number of symbols occupied by a D2D signal in a subframe, the number of subframes for transmitting a D2D signal, etc.), (4) strength of a signal received from an eNB, and/or (5) transmit power strength of a D2D UE.

In the embodiments of the present invention, for clarity, a method for an eNB to directly schedule a resource region of a D2D transmission UE in D2D communication is defined as a mode 1. And, when a D2D transmission resource region is configured in advance or an eNB allocates the transmission resource region, a method for a UE to select a resource unit for D2D communication from the transmission resource region is defined as a mode 2.

In case of D2D discovery, a case of selecting a resource unit for D2D discovery directly selected by a UE from a predetermined resource region or a resource region indicated by an eNB is defined as a type 1. And, a case of scheduling a resource region for a discovery channel directly scheduled by an eNB is defined as a type 2.

In the embodiments of the present invention, channels for D2D communication can also be referred to as a sidelink. In this case, an SA channel is referred to as a physical sidelink control channel (PSCCH), a D2D synchronization signal is referred to as a sidelink synchronization signal (SLSS), and a control channel for broadcasting most basic system information for D2D communication can be referred to as a physical sidelink broadcast channel (PSBCH), respectively. The SLSS can also be named as a PD2DSCH (physical D2D synchronization channel). And, a channel for transmitting a D2D discovery signal can be defined as a physical sidelink discovery channel (PSDCH).

In LTE-A system (Rel-12, 13 or higher), a D2D communication UE is configured to transmit the PSBCH and the SLSS together or is configured to transmit the SLSS. And, the LTE-A system newly defines an S-RSRP (sidelink RSRP) to match synchronization with a different UE in D2D communication. In particular, when UEs intend to perform D2D communication, it may measure the S-RSRP and check UEs of which the S-RSRP is equal to or greater than a specific value. By doing so, it may be able to match synchronization of the UEs only and perform D2D communication. In this case, the S-RSRP can be measured from a DM-RS on the PSBCH. Yet, for a D2D relay operation, the S-RSRP can also be measured from a DM-RS on the PSDCH.

And, an out-coverage UE measures the S-RSRP based on DM-RS signal strength of the SLSS and/or the PSBCH/PSCCH/PSSCH to determine whether or not the S-RSRP becomes a synchronization source for performing a D2D relay operation of the out-coverage UE.

3.2 D2D Communication Scheme

In the embodiment s of the present invention, device to device communication can be used in a manner of being mixed with such a term as D2D communication, direct communication between devices, and the like and has a same meaning. And, the D2D communication may have two types. One is referred to as D2D relay or D2D relay communication performing a relay operation that simply forwards data (or signal) and/or control information to/from a UE located at the outside of an eNB. Another is referred to as D2D direct communication performing direct communication between UEs in a form of being controlled or not controlled by an eNB.

In general, a UE corresponds to a terminal of a user. Yet, if such a network device as an eNB transceives a signal with a UE according to a communication scheme between the eNB and the UE, the eNB can also be regarded as a kind of UEs.

In the following, methods of designating a relay UE (rUE) when UL or DL transmission is performed by utilizing the rUE are explained as embodiments of the present invention. And, when the rUE has both a D2D signal to be relayed to a different UE and data to be directly transmitted to the different UE via D2D communication, a method of transmitting the signal and the data is explained. In this case, for clarity, a target UE of the D2D relay communication of the rUE is defined as a first UE (UE1) or a remote UE and a target UE of the D2D direct communication of the rUE is defined as a second UE (UE2) or a D2D UE.

Figure 14:
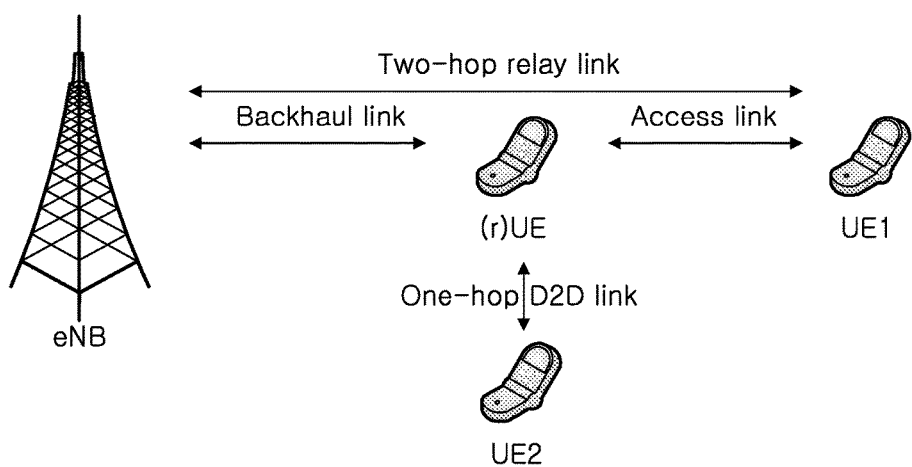
FIG. 14 is a diagram for explaining a relation among a base station, a relay UE, and a general UE as an example of D2D relay communication.

FIG. 14 is a diagram for explaining a relation among a base station, a relay UE, and a general UE as an example of D2D relay communication.

A rUE corresponds to a UE operating as a relay to provide network connectivity to an out-of-coverage UE or a UE incapable of performing direct communication with an eNB. In this case, such a terminology as 'relay' indicates that data received from an eNB or a different UE is forwarded as it is. In the embodiments of the present invention, D2D relay communication can be used as a meaning identical to 'relay' unless it is additionally explained.

The rUE maintains not only a link with the eNB but also a link with a UE1 and forwards information received from the eNB to the UE1 or forwards information received from the UE1 to the eNB. The rUE maintains not only such a link as eNB-rUE-UE1 but also a link for D2D direct communication with the UE2.

In this case, the link eNB-rUE-UE1 is defined as a two-hop relay link and the link between the UE and the UE2 is defined as a one-hop D2D link. A link between the eNB and the rUE constructing the two-hop relay link is defined as a backhaul link and a link between the rUE and the UE1 is defined as an access link.

A method for a UE to determine a resource for transmitting a D2D signal/data can be mainly divided into two types.

One is a method for an eNB to directly designate a resource to be used for an individual UE. This method can be defined as a first mode (mode 1). For example, the eNB transmits resource allocation information (e.g., DCI, etc.) to a UE via PDCCH and the UE can transmit a D2D signal using a resource designated by the eNB.

Another one is a method that the eNB configures a set of resources (e.g., D2D resource pool) capable of being used for D2D signal transmission only and an individual transmission UE selects an appropriate resource from the resource pool and transmits a D2D signal of the transmission UE. This method can be defined as a second mode (mode 2).

3.3 Method of Configuring rUE

In order to perform relay based on a D2D UE supporting D2D, it is necessary to configure a D2D UE operating as a rUE among a plurality of D2D UEs.

In this case, it may consider three methods to trigger a relay operation of a UE. For example, there are (1) a method for an eNB to directly designate a rUE via higher layer signaling, (2) a method for an eNB to dynamically designate a rUE, and (3) a method for a UE to autonomously initiate a relay operation without an individual indication of an eNB.

3.3.1 Configuration Via Higher Layer Signaling

A method for an eNB to configure a rUE via higher layer signaling is explained in the following. For example, the eNB can allocate relay mode configuration information for activating a relay operation and RNTI values configured for the relay UE (rUE) to UEs using a higher layer signal. In this case, a UE designated as a rUE can perform not only DL relay transmission but also UL relay transmission.

For example, when the eNB configures a rUE via the higher layer signal, the eNB can transmit the relay mode configuration information to the rUE to indicate whether the rUE corresponds to a DL type rUE or a UL type rUE. In particular, having received the relay mode configuration information, the rUE is able to check whether the rUE corresponds to a DL rUE or a UL rUE.

If a single rUE relays both DL and UL, battery consumption of the rUE may become big. Hence, it is preferable to distinguish a rUE for DL from a rUE for UL. Moreover, it may also be necessary to distinguish the DL rUE from the UL rUE for a reason described in the following as well as the battery consumption aspect.

When DL transmission is performed, if eNBs attempt to perform transmission based on MBMS, similar to SFN (single frequency network) transmission, DL coverage may considerably increase and ACK/NACK transmission becomes unnecessary. Hence, necessity of the DL rUE may become smaller.

And, due to a difference between transmit power of an eNB and transmit power of a UE, a data transmission success rate may become considerably differentiated depending on DL and UL. For example, although a UE is able to successfully receive system information and data in DL, the UE (e.g., out-of-coverage UE) may have a considerably low success rate of data transmission in UL (although the UE operates using such a method as TTI bundling in LTE/LTE-A system). And, although it is not necessary to have a DL rUE, it may be necessary to have a UL rUE for an out-of-coverage UE (for a packet of big data size only).

Accordingly, in order to allocate the appropriate number of DL rUE and/or a UL rUE, it is necessary for the eNB to know how many UEs are required for relaying. To this end, it is preferable for a UE to report a network situation (e.g., link quality information such as RSRP and the like) to the eNB. In this case, the out-of-coverage UE may inform the eNB of the network situation via a UL rUE. Specifically, the UL rUE can report the network situation of the out-of-coverage UE to the eNB together with data to be relayed.

As mentioned in the foregoing description, if the eNB activates a relay operation of a rUE via higher layer signaling, the eNB can additionally configure a relay timer for a relay mode operation.

For example, if the configured relay timer expires, a relay operation of a rUE can be deactivated.

Or, if a rUE does not perform a relay operation during time for which the relay timer is set, it may be able to configure the relay operation to be deactivated.

Or, the eNB can deactivate a relay mode irrespective of a relay timer configuration.

Or, if a rUE switches to a second mode from a first mode due to the movement of the rUE moving from in-network to out-of-coverage, the eNB can deactivate a relay operation of the rUE.

3.3.2 Method of Dynamically Configuring rUE

When an eNB configures a rUE via higher layer signaling, it may correspond to a semi-static scheme. The semi-static scheme has more delay than a scheme of dynamically configuring a rUE. Hence, it may be difficult to sensitively cope with mobility of a rUE or UEs.

In the following, methods for an eNB to dynamically designate a rUE are explained. For example, in case of DL communication, the eNB transmits a scheduling grant via DCI corresponding to a C-RNTI value of the rUE and may be able to make the rUE perform relay by inserting an identifier of a UE to finally receive data to a destination ID included in a header of the data instead of an identifier of the rUE. Or, it may be able to add a field for indicating whether or not relay is necessary to the scheduling grant of the rUE to activate the field.

3.3.3 Method of Configuring Autonomous rUE

In the following, a method of making a UE autonomously trigger a relay operation without an individual indication of an eNB is explained.

In case of UL communication, although in-network UEs, which have checked information indicating that data transmitted by out-of-coverage UE corresponds data transmitted by a UE1 in FIG. 14, are not designated as a UL relay, the in-network UEs can perform relay.

Or, it may not insert an ID of a specific UE to an SA ID or it may be able to add a relay request field indicating whether or not relay is necessary to SA. In particular, if the relay request field is activated, it may be able to make a UE, which have received the SA, perform relay. In this case, all UEs, which have received the SA, can be configured to perform relay.

Or, among the UEs, if a UE is designated by the eNB, a UE is determined to perform relay via coordination between rUEs, or a UE autonomously determines to perform relay by overhearing relay of a different rUE, it may be able to configure the UEs to perform relay only.

As a different example, in case of groupcast/broadcast communication, since it is profitable to transmit data to UEs as many as possible, if a UE receives broadcast/groupcast data via a backhaul link or an access link, the UE can perform relay although the UE is not designated as a rUE via an eNB. The triggering of the relay operation can also be applied to UE-UE relay that a rUE directly forwards information to a different UE.

4. Method of Transmitting a Receiving D2D Signal

When a UE is triggered to operate as a DL rUE via the methods mentioned earlier in the section 3.3, the UE may have not only data to be relayed via D2D communication but also data to be relayed to a different UE via direct D2D communication. In the following, when there are data to be relayed via an access link and data to be relayed via a one-hop D2D link, methods of multiplexing the two links, i.e., methods of selecting the two links are explained.

In particular, there may exist 4 cases depending on a mode used for a rUE to transmit the access link and the one-hop link. In the following, an operating method for each case is explained.

4.1 Case of Operating in Mode 1 for Both Access Link and One-Hop Link

Figure 15:
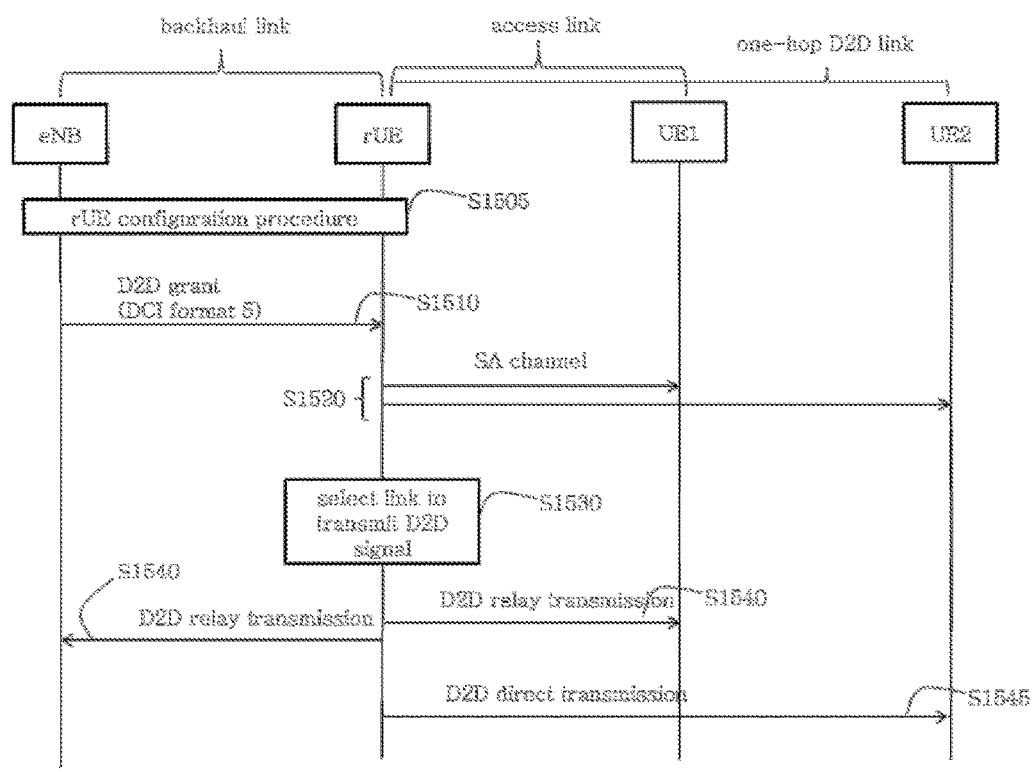
FIG. 15 is a diagram for explaining methods of transmitting a D2D signal when a relay UE maintains both an access link and a one-hop D2D link.

FIG. 15 is a diagram for explaining methods of transmitting a D2D signal when a relay UE maintains both an access link and a one-hop D2D link.

In embodiments of the present invention described in the following, a rUE corresponds to a UE to perform a relay operation. The rUE can be configured by an eNB or a UE may autonomously operate as the rUE depending on channel environment (refer to section 3.3). In this case, assume that the rUE maintains an access link to perform a D2D relay operation with a UE1 and maintains a one-hop link to perform D2D direct communication with a UE2.

Referring to FIG. 15, an eNB can configure a UE capable of operating as a relay UE as a relay UE among UEs belonging to the cell coverage of the eNB. For a procedure of configuring the relay UE, it may refer to the contents mentioned earlier in the section 3.3 [S1505].

In order to support a D2D operation, the eNB transmits a D2D grant including resource allocation information and the like to the relay UE. In this case, regarding a resource allocated to the UE, it may refer to the contents mentioned earlier in FIG. 13 [S1510].

Having received the D2D grant, the rUE can transmit an SA signal to the UE1 and the UE2 via an SA channel. In this case, the SA signal can include the resource allocation information allocated via the D2D grant [1520].

The rUE can select a link to transmit a D2D signal according to content and/or a target of the D2D signal.

For example, in the step S1530, the rUE transmits data for D2D relay communication to the UE1 by selecting the access link and transmits data for D2D direct communication to the UE2 by selecting the one-hop D2D link [S1540, S1545].

In the following, methods for the rUE to perform D2D relay communication or D2D direct communication according to modes of the access link and the one-hop D2D link are explained in detail.

4.1.1 Method 1

A method for an eNB to allocate a resource by transmitting a D2D grant (e.g., DCI format 5) for D2D communication via an access link and a one-hop link is explained in the following.

A D2D grant is configured to schedule a resource for one or more transmission time section(s). The one or more transmission time section(s) scheduled by a single D2D grant are defined as a TTU (transmission time unit) and SLSS/PSBCH/PSDCH/PSSCH can be transmitted during the TTU. A plurality of D2D grants are required for a plurality of TTUs. In particular, if a rUE receives a single D2D grant only in response to a single TTU, the rUE can transmit a D2D signal during the TTU by selecting either an access link or a one-hop D2D link.

As a first method of selecting one from the two links, it may consider a FIFO (first input first output) scheme that a firstly generated data is preferentially transmitted. Yet, in case of using the FIFO scheme, if data of the one-hop link is big, many resources are used for the one-hop link, thereby increasing delay time of the access link, and vice versa.

As a second method, it may consider a method of determining a transmission count ratio between the two links and selecting a transmission link according to the ratio. In this case, the transmission count ratio between the two links can be configured via higher layer signaling or physical layer signaling. The transmission count ratio may correspond to a ratio of the count transmitted via a specific link among prescribed transmission opportunities. The transmission count ratio may vary depending on a data type to be transmitted via each link, a mode set to a UE, channel environment, the amount of data to be transmitted according to each link, and the like.

For example, if it is assumed that the data transmission count via the access link is guaranteed as much as 60%, when the rUE receives a D2D grant ten times, the rUE can perform transmission by selecting the access link maximum 6 times. The rUE selects the access link maximum 6 times because data to be relayed via the access link may not exist. In this case, it is able to transmit the data via the one-hop D2D link.

However, although the transmission count via the access link is assigned as much as 60%, if the rUE completes relay within 5 times of D2D grants only among 10 times of D2D grants, data for the one-hop link can be transmitted using the remaining 5 times of D2D grants. As an extreme case, when the transmission count via the access link is set to 100%, if there is a data to be relayed via the access link, the rUE relays the data via the access link all the time. The rUE can transmit data via the one-hop link only when there is no data to be relayed.

As a third method, the rUE can select a link according to a type of data to be transmitted. In particular, the rUE can select a data to be preferentially transmitted according to a type of data to be transmitted via the one-hop D2D link and a type of data to be relayed via the access link.

For example, if the data to be relayed via the access link correspond to a VoIP (voice over internet protocol) data that a delay requirement is tight and the data to be transmitted via the one-hop D2D link corresponds to a multimedia data that the delay requirement is relatively loose, the rUE may preferentially select and transmit the more urgent data of the access link.

As a different example, in case of a D2D data for notifying whether or not an accident occurs on a road among devices moving fast such as vehicles, it is necessary to forward the D2D data to neighboring devices with a very tight delay requirement to prevent additional accident. In particular, if data of the access link corresponds to urgent D2D data, the rUE may preferentially select and transmit the more urgent data of the access link.

In case of data of an identical type, an eNB may set priority of each link or the data can be transmitted according to a link including predetermined priority on a system.

If the method mentioned earlier in the section 4.1.1 is applied to FIG. 15, a UE can select a link for transmitting a D2D signal/data according to the three methods mentioned earlier in the section 4.1.1 and transmit the data to the UE1 or the UE2 in the step S1530.

4.1.2 Method 2

When an eNB transmits a D2D grant to a rUE, the eNB can transmit information for selecting a specific link from two links to the rUE as well.

For example, if a delay requirement of access link data is very tight, the eNB can transmit a D2D grant corresponding to RNTI assigned for a relay usage to the rUE.

Or, the eNB can transmit a D2D grant including a source identifier and/or a destination identifier corresponding to an access link to the rUE. By doing so, it is able to inform the rUE that the D2D grant corresponds to resource allocation information on the access link.

Or, the eNB can transmit a higher layer signal of which a transmission count ratio of the access link between two links is configured by a specific link by 100% to the rUE. By doing so, it is able to control the rUE to select one link only from the two links and perform D2D communication via the selected link. For example, if the transmission count for the access link is set by 100%, the rUE can transmit data via the one-hop link only when there is no data to be relayed via the access link.

4.1.3 Method 3

In the sections 4.1.1 and 4.1.2, the method for the eNB to transmit a single D2D grant in response to a single TTU has been explained. In embodiments described in the following, a method for the eNB to individually transmit a D2D grant for two links in a single TTU is explained.

When a rUE receives two D2D grants for each link, the rUE can transmit D2D data corresponding to each link by utilizing a separately allocated resource pool. In particular, a resource allocated by a D2D grant for relay is used for transmission via an access link and a resource allocated for a one-hop D2D link can be used for transmission of D2D data.

Referring to FIG. 15, in the step S1510, the eNB transmits two D2D grants to the rUE. In the step S1520, the rUE can transmit scheduling information such as resource allocation information and the like included in the two D2D grants to UEs belonging to each link via an SA channel. In this case, since resource allocation is already separately performed on the two links, it is not necessary for the rUE to perform the step S1530 and the rUE can transceive data with each link via an allocated resource pool.

As a different aspect of the present embodiment, when a D2D resource is allocated to the two links, if there is no data to be transmitted to one of the two links, the rUE may utilize the D2D resource allocated to the link including no data to be transmitted for another link at which data to be transmitted exists.

For example, assume a case that a rUE receives two D2D grants, the rUE has no data to be relayed via an access link, and the rUE has data to be transmitted via a one-hop D2D link. In this case, the rUE may use all D2D resources allocated via the two D2D grants for the data to be transmitted via the one-hop D2D link.

As a further different aspect of the present embodiment, the rUE can perform BSR (buffer state reporting) according to each link.

For example, it may be able to configure a logical channel group ID (LCG ID), a D2D ID for transmitting D2D data, and a relay ID for relaying a D2D UE. The rUE can report a buffer size according to each ID.

Or, it may configure the ID for transmitting D2D data only. And, it may be able to report the sum of buffer sizes of two links or a buffer size of the one-hop D2D link only. This is because, since the eNB is already aware of a buffer size of an access link, it is sufficient for the eNB to receive a report on the sum of buffer sizes of two links or the buffer size of the one-hop D2D link only.

4.2 Both Access Link and One-hop Link Operate in Mode 2

4.2.1 Method of Allocating Common Resource Pool

A common resource pool can be set to two links in an eNB or a system. In this case, as mentioned earlier in the section 4.1, there may exist a problem of selecting a link for performing transmission among the two links.

If a rUE is able to distinguish a resource unit used for an access link from a resource unit used for a one-hop D2D link in a resource pool, it is able to configure the rUE to use the resource units according to each link.

Yet, if it is necessary to use a D2D resource pool for a single link only in a prescribed TTU, it is necessary for the rUE to transmit data by selecting one of the access link and the one-hop D2D link from the resource pool. In this case, the rUE may use the methods of selecting a link mentioned earlier in the section 4.1. For example, the rUE can select a link based on the FIFO scheme, the scheme of configuring a transmission count ratio between two links, or the scheme according to a data type.

4.2.2 Method of Allocating Separate Resource Pool

In embodiments described in the following, it is able to separately configure a D2D resource pool for each of two links. For example, an eNB can configure a plurality of resource pools and the eNB can configure two D2D resource pools (i.e., first resource pool and second resource pool) to be used for two links among a plurality of the resource pools. The eNB can inform a rUE of scheduling information including allocation location information (e.g., start point and end point) on each D2D resource pool and a usage of each D2D resource pool.

In this case, if the two resource pools are allocated in a manner of being separated from each other in time domain, it may be able to minimize a case that an access link operation and a one-hop D2D link operation are collided with each other in terms of the rUE. For example, when the rUE relays data via the access link and receives data via the one-hop D2d link, since the two resource pools are separated from each other in time, it may be able to prevent a case that the rUE receives a D2D signal and transmits a relay signal at the same time.

More specifically, a relay UE is able to relay a downlink D2D signal or an uplink D2D signal via the access link in a first resource pool and may be able to transmit and receive a downlink D2D signal or an uplink D2D signal via the one-hop D2D link in a second resource pool.

Yet, due to a granularity problem capable of representing a start point and an end point of a D2D resource pool, it is difficult to completely separate the two D2D resource pools from each other and there may exist an overlapped section.

If there is an overlapped section between resource pools, the rUE can designate the resource pools to be used for either the access link or the one-hop D2D link only via signaling. In this case, as mentioned earlier in the section 4.1, the rUE can select a link to use the resource pool based on the FIFO scheme, the scheme of configuring a transmission count ratio between the two links, or the scheme based on a data type.

Or, if there is an overlapped section between D2D resource pools and there is a link at which urgent D2D data exists, it may be able to configure the overlapped section to be used for the link. For example, when two resource pools are configured for the access link and the one-hop D2D link, respectively, if the two resource pools are overlapped with each other, a resource unit of the overlapped part can be used for a link where priority is higher or a quicker processing is required.

The contents of the section 4.2.2 are explained in more detail with reference to FIG. 15.

In the step S1505, the eNB can inform a UE of whether or not the UE operates as a relay UE. In this case, the eNB can transmit mode configuration information to the UE to indicate whether the relay UE is used for DL usage or UL usage.

Subsequently, in the step S1510, the eNB can separately allocate a resource pool to be used for the access link and a resource pool to be used for the one-hop D2D link. In particular, the eNB can transmit a D2D grant including scheduling information on a first resource pool and a second resource pool to the rUE.

If the first resource pool and the second resource pool are separated from each other in time domain, the rUE relays a D2D signal via the access link in the first resource pool and can directly transmit a D2D signal via the one-hop D2D link in the second resource pool [S1540, S1545].

If the first resource pool and the second resource pool are allocated in a manner of being overlapped with each other, the rUE selects a link for transmitting a D2D signal in the step S1530 and may be able to transmit a D2D signal. For details, it may refer to the aforementioned contents.

4.3 Case of Operating in Different Mode According to Link 4.3.1 Access Link Operating in Mode 1 and One-hop Link Operating in Mode 2

As mentioned earlier in the embodiments of the section 4.1, if a rUE always receives a D2D grant for an access link only, the rUE can transmit D2D data using a scheme such as a mode 2 in response to a one-hop D2D link.

Or, as mentioned earlier in the embodiments of the section 4.2, if a D2D resource pool is set to the one-hop D2D link only, a resource is allocated to a rUE using a scheme such as a mode 1 and the rUE is able to relay data.

4.3.2 Access Link Operating in Mode 2 and One-hop Link Operating in Mode 1

As mentioned earlier in one of the embodiments of the section 4.1, if a rUE always receives a D2D grant for a one-hop D2D link only, the rUE can transmit D2D data using a scheme such as a mode 2 in response to an access link.

Or, as mentioned earlier in the embodiments of the section 4.2, if a D2D resource pool is set to the access link only, a resource is allocated to a rUE using a scheme such as a mode 1 and the rUE is able to relay data.

4.3.3 Definition on Operation when Mode Per Link is Different

In case of performing D2D communication, a UE operates in a single mode in general. Hence, as mentioned earlier in the sections 4.3 and 4.4, although a rUE is configured to operate in a different mode according to each link, it is preferable to configure the rUE to operate in a single mode at some point.

For example, when priority is put on an access link among the access link and a one-hop D2D link, if there is data to be relayed via the access link, the rUE performs D2D communication in a mode corresponding to the access link. If there is no data to be relayed via the access link, the rUE can perform D2D communication using a mode corresponding to the one-hop D2D link.

On the contrary, when priority is put on the one-hop D2D link, the rUE can perform D2D communication in a mode corresponding to the access link only when there is no data to be transmitted via the one-hop D2D link.

As a different aspect of the present embodiment, as mentioned earlier in the section 4.1, the rUE selects a link to use a corresponding resource pool based on the FIFO scheme, the scheme of configuring a transmission count ratio between two links, or the scheme according to a data type and may operate in a mode according to the selected link at a specific moment.

As a further different aspect of the present embodiment, if a resource pool different from each other according to time (e.g., according to a prescribed TTU) is allocated to the access link and the one-hop D2D link, the rUE can perform an operation for each link in a manner of dividing the operation according to time.

4.4 Method of Reporting Buffer State According to Link

When a UE is triggered to operate as a UL rUE via the embodiments mentioned earlier in the section 4.1, the UE relays D2D data via a backhaul link and the UE may have D2D data to be relayed to a different UE via a one-hop D2D link. In this case, the rUE can perform BSR according to each link.

For example, as mentioned earlier in the section 4.1.3, an eNB or a network system additionally configures a legacy LCG ID, a D2D ID for transmitting D2D data, and a relay ID for relaying a D2D UE and the rUE can be configured to report a buffer size according to each of the IDs.

5. Apparatus

Figure 16:
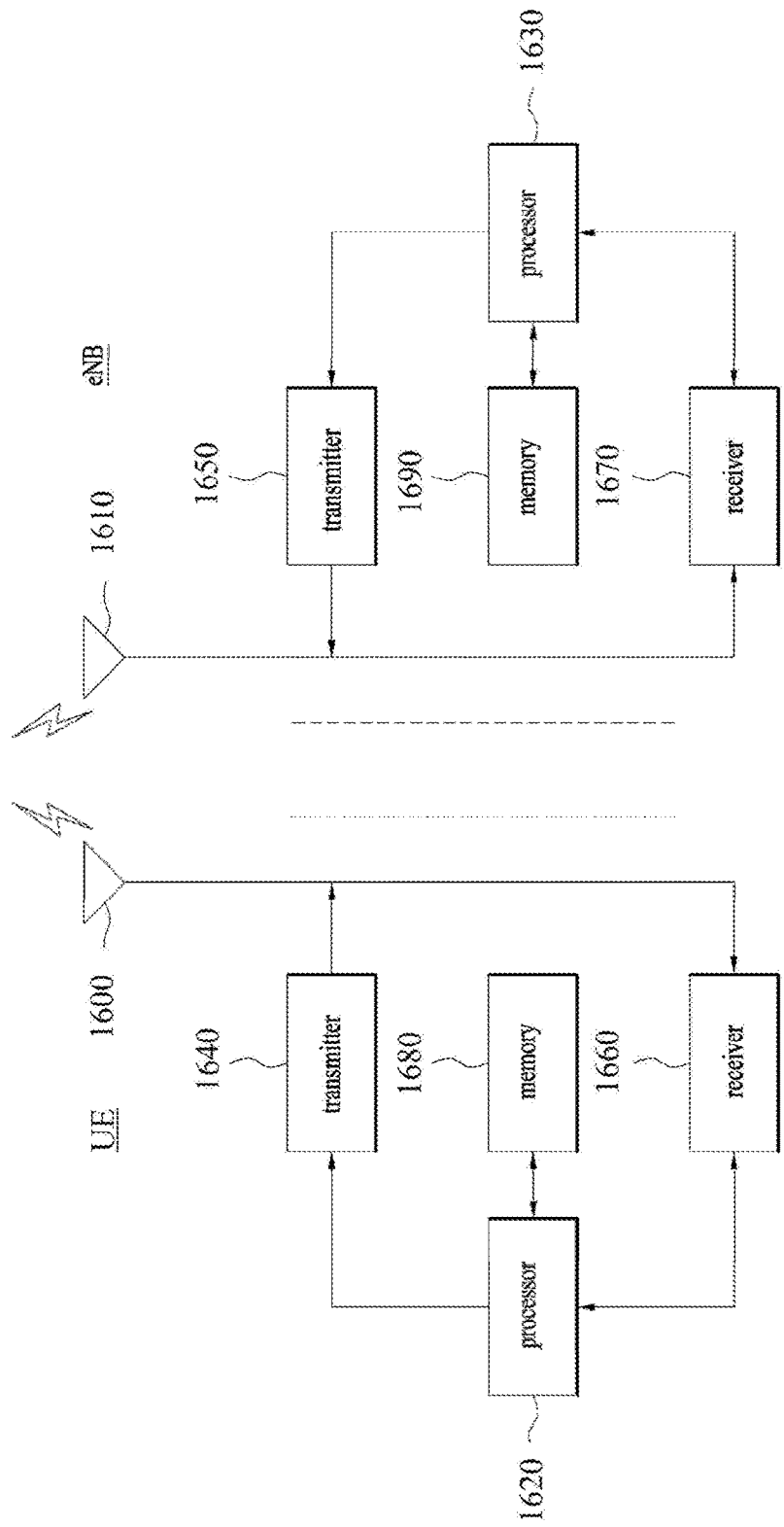
FIG. 16 is a diagram for a device capable of implementing the methods described in FIGS. 1 to 15.

Apparatuses illustrated in FIG. 16 are means that can implement the methods described before with reference to FIGS. 1 to 15.

A UE may act as a transmitter on a UL and as a receiver on a DL. An eNB may act as a receiver on a UL and as a transmitter on a DL.

That is, each of the UE and the eNB may include a transmitter 1640 or 1650 and a receiver 1660 or 1670, for controlling transmission and reception of information, data, and/or messages, and an antenna 1600 or 1610 for transmitting and receiving information, data, and/or messages.

Each of the UE and the eNB may further include a processor 1620 or 1630 for implementing the afore-described embodiments of the present disclosure and a memory 1680 or 1690 for temporarily or permanently storing operations of the processor 1620 or 1630

The embodiments of the present invention can be performed using configuration element and functions of the aforementioned general UE, the relay UE, and the eNB. For example, a processor of the relay UE controls a receiver to receive one or more D2D grants. And, the processor of the relay UE controls a transmitter to transmit a D2D signal/data. For details, it may refer to the sections 3 and 4.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 16 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MB S) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1680 or 1690 and executed by the processor 1620 or 1630. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for transmitting a device-to-device (D2D) signal in a wireless access system supporting D2D communication, the method performed by a relay user equipment (UE) and comprising:
   receiving relay mode configuration information from an evolved Node-B (eNB);
   receiving scheduling information on a first resource pool and a second resource pool from the eNB;
   relaying a D2D signal via an access link on the first resource pool; and
   transmitting a D2D signal via a one-hop D2D link on the second resource pool,
   wherein the relay UE is connected to both the access link and the one-hop D2D link,
   wherein the access link is configured for D2D relay communication with the eNB,
   wherein the one-hop D2D link is configured for D2D direct communication with a different UE,
   wherein the first resource pool and the second resource pool overlap with each other in a prescribed area, and
   wherein when the first resource pool and the second resource pool overlap with each other, the relay UE is configured to transmit a D2D signal via only the access link or the one-hop D2D link on the first resource pool and the second resource pool.

2. The method of claim 1, wherein the relay mode configuration information indicates whether the relay UE is used for uplink or downlink.

3. The method of claim 1, wherein the first resource pool and the second resource pool are separately allocated from each other in time domain.

4. The method of claim 1, wherein when the first resource pool and the second resource pool overlap with each other, the relay UE transmits a D2D signal on the first resource pool and the second resource pool according to (1) a type or priority of D2D data to be transmitted via the access link and the one-hop D2D link, (2) transmission count ratio information between the access link and the one-hop D2D link, or (3) a link at which generated data exists among the access link and the one-hop D2D link.

5. A relay user equipment (UE) for efficiently transmitting a device-to-device (D2D) signal in a wireless access system supporting D2D communication, the relay UE comprising:
   a transmitter;
   a receiver; and
   a processor, operatively coupled to the transmitter and the receiver, that:
   controls the receiver to receive relay mode configuration information from an evolved Node-B (eNB),
   controls the receiver to receive scheduling information on a first resource pool and a second resource pool from the eNB,
   controls the transmitter to relay a D2D signal via an access link on the first resource pool,
   controls the transmitter to transmit a D2D signal via a one-hop D2D link on the second resource pool,
   wherein the relay UE is connected to both the access link and the one-hop D2D link, wherein the access link is configured for D2D relay communication with the eNB,
   wherein the one-hop D2D link is configured for D2D direct communication with a different UE,
   wherein the first resource pool and the second resource pool are overlap with each other in a prescribed area, and wherein when the first resource pool and the second resource pool overlap with each other, the processor further controls the transmitter to transmit a D2D signal via only the access link or the one-hop D2D link on the first resource pool and the second resource pool.

6. The relay UE of claim 5, wherein the relay node configuration information indicates whether the relay UE is used for uplink or downlink.

7. The relay UE of claim 5, wherein the first resource pool and the second resource pool are separately allocated from each other in time domain.

8. The relay UE of claim 5, wherein when the first resource pool and the second resource pool overlap with each other, the processor further controls the transmitter to transmit a D2D signal on the first resource pool and the second resource pool according to (1) a type or priority of D2D data to be transmitted via the access link and the one-hop D2D link, (2) transmission count ratio information between the access link and the one-hop D2D link, or (3) a link at which generated data exists among the access ink and the one-hop D2D link.

\* \* \* \* \*